(12) United States Patent
Lucas

(10) Patent No.: US 9,887,549 B2
(45) Date of Patent: Feb. 6, 2018

(54) ELECTRICITY DISTRIBUTION CIRCUIT WITH SWITCHES SUPPLYING LOADS BY MEANS OF A SELECTABLE NUMBER OF SOURCES

(71) Applicant: HISPANO SUIZA, Colombes (FR)

(72) Inventor: Romain Lucas, Saint-Nazaire (FR)

(73) Assignee: HISPANO SUIZA, Colombes (FR)

(*) Notice: Subject to any disclaimer, the term of this patent is extended or adjusted under 35 U.S.C. 154(b) by 192 days.

(21) Appl. No.: 14/908,054

(22) PCT Filed: Aug. 4, 2014

(86) PCT No.: PCT/FR2014/052030
§ 371 (c)(1),
(2) Date: Jan. 27, 2016

(87) PCT Pub. No.: WO2015/019015
PCT Pub. Date: Feb. 12, 2015

(65) Prior Publication Data
US 2016/0164297 A1    Jun. 9, 2016

(30) Foreign Application Priority Data
Aug. 5, 2013 (FR) ..................................... 13 57793

(51) Int. Cl.
*H02J 3/38* (2006.01)
*H02J 3/00* (2006.01)
*H02J 3/14* (2006.01)

(52) U.S. Cl.
CPC .............. *H02J 3/381* (2013.01); *H02J 3/005* (2013.01); *H02J 3/14* (2013.01); *B64D 2221/00* (2013.01)

(58) Field of Classification Search
None
See application file for complete search history.

(56) References Cited

U.S. PATENT DOCUMENTS 8,261,102 B2 * 9/2012 Cheng .................... G06F 1/263
307/18
2012/0205976 A1 * 8/2012 Shih ......................... H02J 1/10
307/24

(Continued)

FOREIGN PATENT DOCUMENTS

WO    WO 2009/153657 A1    12/2009

OTHER PUBLICATIONS

International Search Report dated Feb. 9, 2015, in PCT/FR2014/052030 filed Aug. 4, 2014.

*Primary Examiner* — Cassandra Cox
(74) *Attorney, Agent, or Firm* — Oblon, McClelland, Maier & Neustadt, L.L.P.

(57) ABSTRACT

A circuit, an installation that uses the circuit, and its design method, the circuit for distributing electricity that can supply at least two loads from two sources, and including: conductors, some of which form outputs configured to be connected to external equipment, and switching devices configured to establish a path between each load and the two sources by connecting the loads and sources to the outputs. For at least one pair of determined loads, the two switching devices on the paths connecting each source to the two loads of the pair are integrated in a double-flow switch. The double-flow switch is connected at its central point to the output that can be connected to the corresponding source.

8 Claims, 2 Drawing Sheets

(56) References Cited

U.S. PATENT DOCUMENTS

2013/0049463 A1\* 2/2013 Shih ................ H02J 1/102
  307/23
2013/0069428 A1\* 3/2013 Lee ................ H02J 9/06
  307/18

\* cited by examiner

ELECTRICITY DISTRIBUTION CIRCUIT WITH SWITCHES SUPPLYING LOADS BY MEANS OF A SELECTABLE NUMBER OF SOURCES

TECHNICAL FIELD

The present invention relates to a circuit for distributing electricity that connects two sources to loads in a different manner depending on the operating modes. More specifically, it deals with the arrangement of the switches in the circuit when certain loads need to be able to be supplied by one or other of the two sources and, in certain cases, by both sources simultaneously.

PRIOR ART

Many installations, particularly for systems on board aircraft or, more specifically, for controlling propulsion machinery, several electrical equipment are supplied by two sources that can be activated in parallel.

This configuration provides safety by virtue of a redundant supply for the equipment and also provides flexibility of use as it allows the stress from the sources to be adapted as a function of the operating mode of the equipment. Indeed, for the considered installation type, all equipment are not active or do not operate at full power in the various operating configurations of the installation. Therefore, sometimes the two sources are connected to one or more equipment, each capable of requiring, at different times, the cumulative power that the two sources can supply, and to a set of equipment that does not require more power at any time than can be supplied by one of the sources. Therefore, being able to modulate the connections in order to supply this equipment is of interest.

Throughout the remainder of this document, the operating modes for each equipment, called a load, are controlled by means outside of the distribution circuit. The sources are also considered herein as having their own control devices. In these conditions, the circuit for distributing electricity between the sources and the loads is made up of a set of connections and of switching devices that form paths between the sources and the loads that can be open or closed in order to adapt its configuration to the operation of the sources and of the loads.

Normally, as shown in FIG. 1 for three loads $CH_1$, $CH_2$, $CH_3$ supplied by the two sources $S_1$ and $S_2$, each load is connected to the circuit by a single flow switch $J_1$, $J_2$ or $J_3$ comprising a single switching device that is open or closed according to whether or not the load is active. Furthermore, in order to be able to use the two sources at the same time on certain loads, a connection controlled by a single flow switch $J_4$ is made between them. The circuit of FIG. 1 can be easily generalised to more than three loads by connecting the additional loads on either side of the switch $J_4$ that is located between the sources. Each load requires a current supply with a certain number of characteristics, for example in terms of voltage and of current, and in return imposes a certain number of stresses on the equipment located upstream on the circuit. The same applies to the sources, which will also impose stresses on the equipment located opposite them in the circuit, depending on the stress of the loads. It is easy to design the single flow switches for the circuit shown in FIG. 1. Each switch $J_1$, $J_2$, $J_3$ that is located opposite a load $CH_1$, $CH_2$, $CH_3$ is designed relative to the maximum stresses of the load. The switch $J_4$ that is located between the sources $S_1$ and $S_2$ in turn is designed relative to the maximum level of the stress that can be imposed by either source for the maximum stress of the loads.

Even though it meets the main objectives, the solution that is currently used in FIG. 1 has several disadvantages. In terms of operating safety, there is no tolerance with respect to all initial faults, particularly those associated with the switches $J_1$, $J_2$, $J_3$ that are located opposite the loads. A load can no longer be supplied if its switch breaks down in the open position and can no longer be disconnected if it is in the closed position. Furthermore, if a source $S_1$ or $S_2$ is faulty it cannot be isolated from the circuit. In terms of operation, when parallelising the sources, when the switch $J_4$ that is located between them is closed, the impedance of this switch is such that the paths connecting the two sources $S_1$, $S_2$ and a load $CH_1$, $CH_2$ or $CH_3$ do not have the same properties.

Finally, in terms of production, this assembly is not optimal in terms of cost, spatial requirement and weight. Firstly, as soon as at least one load needs to be supplied by the two sources, said load imposes stresses on the switch that controls the load that are greater than the maximum level of the stresses that can be supplied by each source. The factor can be up to twice as much. Moreover, the weight and the spatial requirement of the switches, particularly when the circuit is three phase, are directly associated with these stresses. Furthermore, beyond certain stresses, it is impossible for switches to be used on a rack. The manufacture of this type of switch thus imposes additional costs. Furthermore, the solution of FIG. 1 uses four different single switches. As the weight and the spatial requirement of the circuit are directly associated with the number of installed differentiated switches, then reducing this number would be of interest.

The object of the present invention is to produce a circuit that does not have the aforementioned disadvantages.

DESCRIPTION OF THE INVENTION

The invention relates to a circuit for distributing electricity that is intended to supply at least two loads from two sources, comprising conductors, some of which form outputs capable of being connected to the sources and to the loads, and switching devices, said circuit being arranged so that the conductors with the switching devices establish at least one path conducting electricity between each load and the two sources.

Such a distribution circuit is noteworthy in that each path between a source and a load comprises a single switching device, and in that, for at least one pair of determined loads, the two switching devices on the paths connecting each source to the two loads of said pair are integrated in a double-flow switch, which is an apparatus integrating two switching devices each capable of controlling the connection of a conductor to the same central contact, called central point, said double-flow switch being connected at its central point to the output intended to be connected to the corresponding source.

By virtue of a single switching device per path, the invention allows to associate unlimited any load with one or other of the two sources or with both sources. In addition to the flexibility of use, such a circuit provides a tolerance to any initial breakdown on the installation. Indeed, it allows a faulty source or load to be isolated, whilst continuing to control the rest of the installation. Similarly, it offers bypass paths if a switching device is faulty.

Furthermore, a switching device will never exceed a flow of power that is greater than that which can be supplied by one of the two sources, even if the load uses the power of the two sources. A circuit according to the invention therefore can allow the operating stresses of a switching device to be limited to those imposed by each of the sources, even if a load can impose greater stresses. Finally, particularly in the case where more than three loads are connected to two sources, the number of switching devices is minimal.

Practically, a double-flow switch that integrates two switching devices that must withstand the same operating stresses is lighter and poses fewer integration problems than two distinct apparatus. It is therefore of interest to group the switching devices in pairs in these double-flow switches. Furthermore, it is possible for the connections according to the invention to be made by connecting the central point of a double-flow switch to each load, with these two other outputs being connected to the sources. In this case, during nominal operation of the installation, the contacts of the double-flow switch at its central point must not exceed a power that is greater than the maximum power of the load. The double-flow switch is therefore designed according to the stresses imposed by the load.

Finally, with respect to the foregoing description, during nominal operation of the installation the contacts of the double-flow switch located in front of a source at its central point must not exceed a power that is greater than the maximum power of the source. The double-flow switch is therefore designed according to the stresses imposed by the source. This arrangement is particularly interesting when said two loads can, during certain operating phases, use a power that is greater than that which can be supplied by a single source. This allows the two switches to be designed for lower stresses, thus reducing the cost and the weight compared to switches that would be designed for the stresses imposed by these loads. In particular, in terms of cost, it is possible that the stresses imposed by the sources allow products to be used on a rack, whereas those imposed by the loads do not allow the same.

Preferably, in a circuit for distributing electricity connecting the sources to the pair of loads as has been described, for each load that does not belong to said pair, the switching devices on the paths connecting this load to the two sources are integrated in a double-flow switch that is connected at its central point to the output intended to be connected to said load.

This configuration is particularly advantageous when the loads belonging to said pair are those that impose the maximum stresses. In particular, if the loads are classified in decreasing order of stresses, an interesting configuration occurs if the third load does not require more power than is supplied by the most powerful source. In this case, the design of the switches definitely can be limited to the operating stress of the most powerful source.

Therefore, the invention particularly relates to a circuit for distributing electricity as has been described, for which the double-flow switches connected at their central point to the outputs intended to be connected to a load are designed for operating stresses that are lower than or equal to the greatest operating stress of the two double-flow switches connected at their central point to the outputs intended to be connected to a source. Furthermore, this configuration minimises the number of individual apparatus to be used to produce the set of switching devices in the connections between the sources and the loads. Given that the weight and the difficulty of integration are associated with this number of individual apparatus, whether they are double-flow or single-flow switches, this embodiment is optimal from this perspective.

One particular embodiment relates to a circuit for distributing electricity for which the conductors and the switching devices are arranged to process three-phase current. Indeed, the operating stresses in a three-phase circuit cause production stresses that are particularly sensitive for the triple pole switches, whether they are single flow or double-flow switches. It is therefore particularly interesting in their case to limit power level, as well as the number.

The invention further relates to an installation comprising a circuit according to one of the preceding embodiments, two sources and loads supplied by the sources by means of said circuit, each switch of which is designed to respond to the operating stresses of the load or of the source connected to its central point. More particularly, it relates to an installation comprising two sources each capable of delivering a determined power and two loads having operating modes that can require the supply from the two sources, with these two loads forming said pair of loads. Advantageously, the two loads that form part of said pair are those that impose, on a switching component placed in series therewith, the maximum stresses on all of the loads of the installation. This latter configuration allows double-flow switches to be used which having the lowest maximum design stress.

The invention further relates to a method for manufacturing such an installation comprising a step of identifying stresses imposed by the loads on a switching device placed in series therewith, and comprising the production of a circuit for distributing electricity where said pair of loads is made up of those loads that impose the two greatest stresses.

DETAILED DESCRIPTION OF THE INVENTION

The present invention will be better understood and further details, features and advantages of the present invention will become apparent upon reading the following description, with reference to the accompanying drawings, wherein.

A first example of the application of the invention is shown for three loads $CH_1$, $CH_2$ and $CH_3$ supplied via two sources $S_1$ and $S_2$ with three-phase current. In this example, the source $S_1$ supplies a power $P_1$ and the source $S_2$ supplies a power $P_2$ that is lower than, or equal to $P_1$. In certain configurations, the loads $CH_1$ and $CH_2$ are capable of consuming more power than can be supplied by one of the two sources, whilst being able to be used, in other configurations, with less power. However, the third load $CH_3$ still consumes less power. This application allows the prior art to be compared, with reference to FIG. 1, with an embodiment according to the invention, with reference to FIG. 2.

Figure 1:
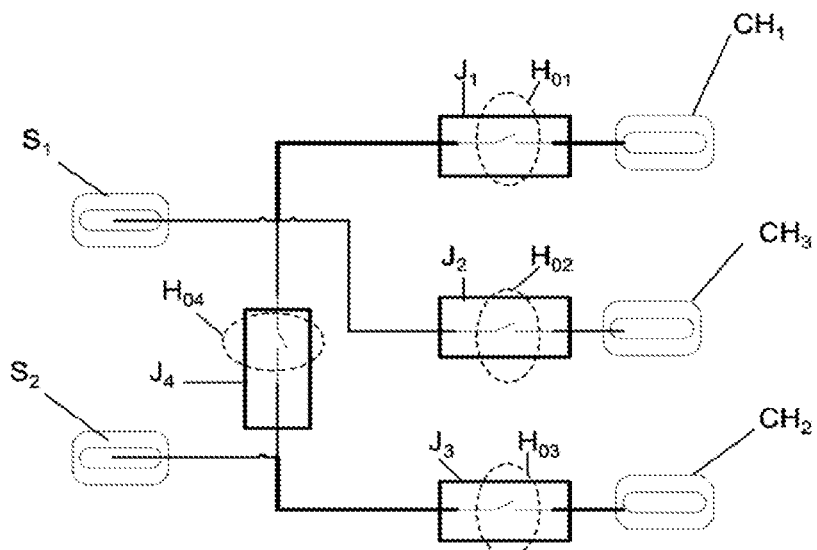
FIG. 1 is a diagram of a circuit for distributing electricity with three loads via two sources according to the prior art.
Figure 2:
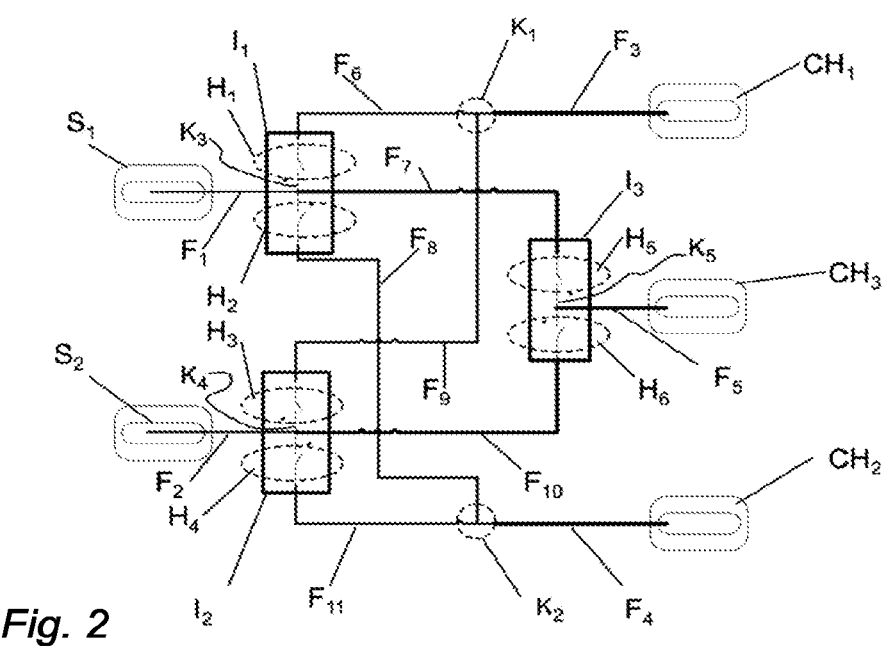
FIG. 2 is a diagram of a circuit for distributing electricity with three loads via two sources according to the invention.

Throughout the remainder of the description, the components of FIGS. 1 and 2 are shown using a single line in order to simplify the understanding of the connections between elements, even though three-phase current is used in the example of the application. Indeed, the three-phase circuits have exactly the same schemes. Throughout the document, the notion of conductor relates to a device conducting the current through all of its components with a negligible impedance. With respect to the three-phase current, the conductor is therefore made up of three strands. Furthermore, the triple pole notion for a switch refers to the three parallel circuits followed by the three phases of the current. In particular, a switching device hereafter is understood to be a means for opening or for closing the three parallel circuits of the three phases of the three-phase current at the same time. However, the notions of single flow or of double flow for a switch refer to the number of current flows that meet on a contact, the corresponding switches thus integrate one or two switching devices.

Given their features and their intended conditions of use, these sources and these loads are capable of inducing a maximum stress on a triple-pole single-flow switching component placed in series therewith. Therefore, in the circuit according to the prior art shown in FIG. 1, each load $CH_i$ (with i ranging from 1 to 3), induces a maximum load $C_i$ on the switching device $H_{0i}$ placed in series therewith. The switches $J_1$, $J_2$ and $J_3$ that integrate these switching devices $H_{01}$, $H_{02}$ and $H_{03}$ are therefore respectively designed for the stresses $C_1$, $C_2$ and $C_3$. The switch $J_4$, which is located between the sources $S_1$ and $S_2$, in turn is in series either with the source $S_1$ or with the source $S_2$, depending on the operating conditions: either the electric flow goes from $S_1$ to the load $CH_3$ or it goes from the source $S_2$ to one of the loads $CH_1$ or $CH_2$. With the source $S_1$ imposing a stress $Cs1$ and the source $S_2$ imposing a stress $Cs2$, the switch $J_4$ is designed for the maximum value of these two stresses.

With reference to FIG. 2, in order to produce the circuit, the sources $S_1$ and $S_2$, the loads $CH_1$, $CH_2$, $CH_3$ and the switches $I_1$, $I_2$, $I_3$ are connected to conductors $F_1$ to $F_{11}$. The outputs of the circuit are made via the conductors $F_1$ to $F_5$ that are equipped with means capable of establishing a connection with the corresponding load or source. This allows paths to be made for the three-phase current that connect each load to the two sources, which paths are open or closed depending on the status of the switching devices $H_1$ to $H_6$ of the switches $I_1$, $I_2$, $I_3$. It is to be noted that the central contacts $K_3$, $K_4$, $K_5$ of the switches $I_1$, $I_2$, $I_3$ each form a junction between two paths. Furthermore, the two paths connecting the load $CH_1$ to the sources $S_1$ and $S_2$ meet at $K_1$, and the two paths connecting the load $CH_2$ to the sources $S_1$ and $S_2$ meet at $K_2$. It is to be noted that the switches $I_1$ and $I_2$ are found on these paths between the source $S_1$ or $S_2$ and the junction $K_1$ or $K_2$ before the shared part $F_3$ or $F_4$ that is connected to the load. Similarly, the switch $I_3$ enables the switching devices on the paths between the sources $S_1$, $S_2$ before the shared part $F_5$ that is connected to the load $CH_3$.

The circuit according to the invention therefore uses three triple-pole double-flow switches that are connected as follows:
  the central point of the switch $I_1$ is connected to the source $S_1$, an output is connected to the load $CH_1$ and an output is connected to the load $CH_2$;
  the central point of the switch $I_2$ is connected to the source $S_2$, an output is connected to the load $CH_1$ and an output is connected to the load $CH_2$;
  the central point of the switch $I_3$ is connected to the load $CH_3$, an output is connected to the source $S_1$ and an output is connected to the source $S_2$.

These triple-pole double-flow switches also have a feature whereby the switching of the connection of the contacts that are connected at their central point to the contacts connected on one side is independent of that which corresponds to the opposite side.

It is therefore easy to note that such a circuit allows at least the following associations, which are likely to correspond to an operating mode of the installation:

A1: a single load, $CH_1$, $CH_2$ or $CH_3$, consuming a power lower than $P_2$, is supplied by only one of the sources $S_1$ or $S_2$;
A2: only one of the loads, $CH_1$ or $CH_2$, consuming a power lower than $P_1$, but greater than or equal to $P_2$, is supplied by the single source $S_1$;
A3: only one of the loads, $CH_1$ or $CH_2$, consuming a power lower than $P_1+P_2$, but greater than or equal to $P_2$, is supplied by the two sources $S_1$ and $S_2$ supplying the required power with any power distribution within the limit of their respective capacities;
A4: only one of the loads, $CH_1$ or $CH_2$, consuming a power lower than $P_1+P_2$, but greater than $P_1$, is supplied by the two sources $S_1$ and $S_2$ supplying the required power with any power distribution within the limit of their respective capacities;
A5: two loads, to be selected from $CH_1$, $CH_2$ and $CH_3$, simultaneously consuming powers that for the first load are lower than or equal to $P_1$ and for the second load are lower than or equal to $P_2$, are supplied in a dedicated manner via $S_1$ and $S_2$, respectively.

A first advantage of the invention over the prior art is noted in terms of the possible associations, and therefore the flexibility of use of the installation. Indeed, as the circuit of FIG. 1 is not symmetrical, it is not possible for the association A2 to be implemented if it is the load $CH_2$ that consumes more power than can be supplied by $S_2$. Indeed, in this case it is not possible to disconnect the source $S_2$ without also cutting the connection to the source $S_1$. However, in order to make the association A2 with the circuit of FIG. 2, the switches $I_2$ and $I_3$ simply need to be opened on the two sides by placing the switch $I_1$ in the open position towards the load $CH_1$ and in the closed position towards the load $CH_2$.

Similarly, for the example of the association A5 that dedicates the source $S_1$ to the load $CH_2$ and the source $S_2$ to the load $CH_1$, it is easy to verify that a path making this association can be created with the invention, whereas the circuit of FIG. 1 does not allow the two loads to be supplied at the same time by dissociating the circuits through which the flows of power pass. Other examples can be found. Furthermore, as has been noted in the preamble, when making an A3 or A4 type association with the circuit of FIG. 1, the paths connecting the load to the two sources have a difference in impedance due to the switch $J_4$ that is positioned between these two sources, whereas the circuit of FIG. 2 according to the invention, whilst using identical switches $I_1$ and $I_2$, allows this symmetry to be obtained.

Furthermore, given the fact that the contacts connected to the central points of the triple-pole double-flow switches are in series with the sources and the loads to which they are connected, the stresses Ci (with i ranging from 1 to 3) for the loads Ci, as well as $Cs_1$ and $Cs_2$ for the sources, that must be taken into account when designing these switches, are the same as those previously defined. Therefore:
  the triple-pole double-flow switch $I_1$ is designed for the stress $Cs_1$ imposed by the source $S_1$;
  the triple-pole double-flow switch $I_2$ is designed for the stress $Cs_2$ imposed by the source $S_2$;
  the triple-pole double-flow switch $I_3$ is designed for the stress $C_3$ imposed by the load $CH_3$.

Therefore, it is to be noted that the greatest stresses $C_1$ and $C_2$ that are associated with the loads $CH_1$ and $CH_2$ do not occur in the design of a circuit according to the invention, as opposed to the prior art.

The gain can be shown in the particular application where two uninterruptible power supplies $S_1$ and $S_2$ are associated with two 30 kVA permanent magnet synchronous machines $CH_1$ and $CH_2$ and one 10 kVA permanent magnet asynchronous machine $CH_3$. Furthermore, any one of the motors $CH_1$ or $CH_2$ is capable of being used up to powers of 80 kVA (a long transition is provided in the operation of the installation). Two identical uninterruptible power supplies $S_1$ and $S_2$ have been selected with a maximum output power of 40 kVA, that is half of the maximum power provided for one of the motors.

According to the invention, the circuit is therefore enabled by using two triple-pole double-flow switches $I_1$ and $I_2$ that are designed for the 40 kVA stress from the uninterruptible power supplies $S_1$ and $S_2$ and a triple-pole double-throw switch $I_3$ that is designed for the 10 kVA stress from the synchronous motor $CH_3$.

It can be noted that this circuit effectively allows the contemplated associations to be made:
  A1: one of the motors $CH_1$, $CH_2$ or $CH_3$ is supplied at its nominal power via an uninterruptible power supply $S_1$ or $S_2$;
  A3 or A4: one of the motors $CH_1$, $CH_2$ or $CH_3$ is supplied at its nominal power via the two uninterruptible power supplies $S_1$ or $S_2$;
  A5: the two motors $CH_1$ and $CH_2$ are simultaneously supplied at their nominal power via the uninterruptible power supply $S_1$ for one motor and via the uninterruptible power supply $S_2$ for the other motor;
  A2: one of the motors $CH_1$ or $CH_2$ is supplied with 80 kVA of power via the two uninterruptible power supplies $S_1$ and $S_2$ in parallel.

In order to be able to produce these configurations with a circuit as shown in FIG. 1, two switches $J_1$ and $J_2$ designed for a stress of 80 kVA would have needed to be implemented instead of the two switches $I_1$ and $I_2$ that are designed for a stress of 40 kVA. This example demonstrates the fact that the stresses that a switch has to withstand can be reduced by up to a factor of two. Furthermore, the invention only uses three triple-pole double-flow switches as opposed to four triple-pole single-flow switches for the previous solution. Given the technology that is used, the three switches according to the invention are lighter and less bulky than the four switches of the prior art, some of which also have to be designed for greater stresses.

From a safety perspective, the embodiment shown in FIG. 1 has a tolerance to any initial breakdown for a flow of power that is lower than or equal to $P_2$ and in some cases offers a breakdown tolerance for a flow of power that is equal to $P_1+P_2$. Indeed:
  in the event of a fault on a source $S_1$ or $S_2$, it can be isolated using the switch or $I_2$ located opposite the source;
  in the event of a fault on a load $CH_1$ or $CH_2$, it can be isolated by opening the switching devices opposite contacts that correspond therewith on the switches and $I_1$ and $I_2$;
  in the event of a fault on the load $CH_3$, it can be isolated using the switch $I_3$ located opposite the load;
  in the case of a switching device between contacts that is blocked in the open state on one of the switches, the affected load can still be controlled by the source to which it is connected using the switching device between contacts that is not blocked. Furthermore, if it is a switching device between contacts of one of the two switches $I_1$ or $I_2$ located opposite a source, one of the loads $CH_1$ or $CH_2$ can still be supplied at the power $P_1+P_2$;
  in the case of a switching device between contacts that is blocked in the closed state on a switch, the affected load can still be controlled by the source to which it is permanently connected and by parallelising the two sources; all of the loads can still be controlled by at least one source. However, only one of the loads $CH_1$ or $CH_2$ can still be supplied at the power $P_1+P_2$, on the condition that the switching device between blocked contacts is one of the devices that affects this load.

In one particular embodiment, a mechanical safety can be installed on a switch that prevents the simultaneous closure of its two switching devices. For example, this system can be installed on the switch $I_3$. This prevents accidentally passing an overpower through the load $CH_3$ that originates from the combining of the two sources. In a further example, this system that is installed on the switch $I_2$ can prevent a failure of the source $S_2$ by requesting that it supplies an excessive power in order to supply the two loads $CH_1$ and $CH_2$ at the same time.

The invention also relates to an embodiment that only comprises the loads $CH_1$ and $CH_2$ that can require a power greater than $P_2$ delivered by the weakest of the two sources. In this case, the ratio of the number of switches used relative to the prior art is two-to-three.

Figure 3:
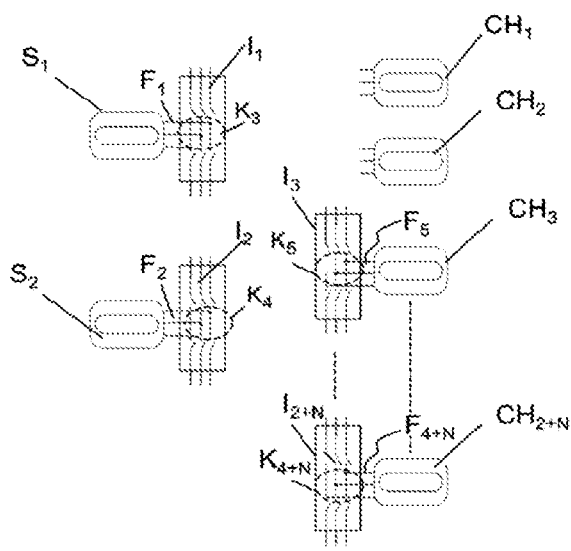
FIG. 3 is a diagram of a circuit for distributing electricity with 2+N loads via two sources according to the invention.

In a more extensive embodiment, next to the two loads $CH_1$ and $CH_2$, the installation comprises N loads with the maximum operating power being lower than the power $P_2$ that can be delivered by the weakest source. These loads, designated $CH_3$ to $CH_{2+N}$, therefore impose stresses $C_3$ to $C_{2+N}$ on the contacts placed in series therewith, which stresses are lower than the stresses $CS_1$ and $CS_2$ imposed by the sources $S_1$ and $S_2$. With reference to FIG. 3, the circuit according to the invention respectively associates a triple-pole double-flow switch $I_3$ to $I_{2+N}$ with each load $CH_3$ to $CH_{2+N}$, which switch is designed for a stress $C_3$ to $C_{2+N}$. Each load $CH_3$ to $CH_{2+N}$ is respectively connected to the central point $K_5$ to $K_{4+N}$ of the switch $I_3$ to $I_{2+N}$ by an output conductor $F_5$ to $F_{4+N}$. As is the case for the first embodiment, each switch $I_3$ to $I_{2+N}$ is connected by means of conductors, not shown, to the source $S_1$ via one of its output sides and to the source $S_2$ via the other side.

Furthermore, as in the first embodiment, the source $S_1$ is connected via an output conductor $F_1$ to the central point $K_3$ of a switch $I_1$, which is designed for the stress $CS_1$, and the source $S_2$ is connected via an output conductor $F_2$ to the central point $K_4$ of a switch $I_2$, which is designed for the stress $CS_2$. The connections via conductors, not shown in FIG. 3, to the loads $CH_1$ and $CH_2$ are the same as in FIG. 2.

This embodiment allows the same associations A1 to A5 as those described for the first embodiment by replacing the load $CH_3$ with any one of the loads $CH_3$ to $CH_{2+N}$. It verifies the same criteria of tolerance to an initial breakdown. Finally, the switches $I_1$ and $I_2$ still have the greatest operating stresses, independently of the values corresponding to the loads $CH_1$ and $CH_2$.

In an even more general manner, this embodiment is applicable even if more than two loads need to be supplied in parallel via the two sources. In this case, the loads are classified in decreasing order of the stresses that they impose on a switching component placed in series therewith. The loads $CH_1$ and $CH_2$, which are connected to the switches $I_1$ and $I_2$ located in front of the sources, in this case are those that impose the greatest stresses. However, so as not to limit the design of the switches located in front of the loads to the smallest stress imposed by the sources, the greatest stresses imposed by $CH_1$ and $CH_2$ are limited to the stress of the strongest source $S_1$.

Figure 4:
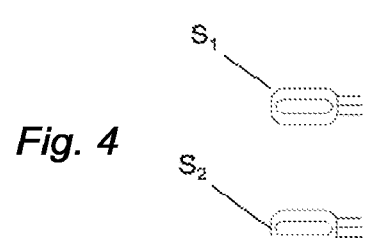
FIG. 4 is a diagram of a variant of an embodiment of a circuit for distributing electricity with 2+N loads via two sources.

In one variant of an embodiment, the loads $CH_1$ and $CH_2$ are processed in the same way as the loads $CH_3$ to $CH_{2+N}$ by connecting them to the central point of the switches $I_1$ and $I_2$, as shown in FIG. 4. This variant has the same functionalities as the preceding embodiment, but this time the switches $I_1$ and $I_2$ must be designed for the stresses that correspond to the loads $CH_1$ and $CH_2$. Therefore, they are bulkier and more expensive.

In one variant of the various embodiments that have been described, at least one of the triple-pole double-flow switches is replaced by two triple pole single flow switches designed for the same operating stress. This variant has the same functionalities and verifies the same safety criteria as the corresponding variant produced with only triple-pole double-flow switches. However, the weight of the two switches is greater and their mechanical integration is more complex.

The invention claimed is:

1. A circuit for distributing electricity that can supply at least two loads from two sources, comprising:
   conductors, some of which form outputs configured to be connected to the sources and to the loads; and
   switching devices;
   wherein the conductors with the switching devices establish at least one path conducting electricity between each load and the two sources;
   wherein each path between a source and a load comprises a single switching device; and
   wherein, for at least one pair of determined loads, the two switching devices on the paths connecting each source to the two loads of the pair are integrated in a double-flow switch, which is an apparatus integrating two switching devices each configured to control connection of a conductor to a same central contact as a central point, the double-flow switch being connected at its central point to the output configured to be connected to the corresponding source.

2. A circuit for distributing electricity according to claim 1, wherein, for each load that does not belong to the pair, the switching devices on the paths connecting the load to the two sources are integrated in a double-flow switch that is connected at its central point to the output configured to be connected to the load.

3. A circuit for distributing electricity according to claim 2, wherein the double-flow switches that are connected at their central point to the outputs configured to be connected to a load are configured for operating stresses that are less than, or equal to the greatest operating stress of the two double-flow switches that are connected at their central point to the outputs configured to be connected to a source.

4. A circuit for distributing electricity according to claim 1, wherein the conductors and the switching devices are configured to process three-phase current.

5. An installation comprising a circuit according to claim 1, with two sources and loads supplied by the sources by the circuit, each switch of which is configured to respond to operating stresses of the load or of the source connected to its central point.

6. An installation according to claim 5, comprising two sources each configured to deliver a determined power and at least two loads having operating modes that can require the supply from the two sources, the two loads forming the pair of loads.

7. An installation according to claim 6, wherein the two loads forming part of the pair are loads that impose, on a switching component placed in series therewith, maximum stresses on all of the loads of the installation.

8. A method for manufacturing an installation according to claim 6, comprising identifying stresses that the loads impose on a switching device placed in series therewith, and comprising production of a circuit for distributing electricity, wherein the pair of loads include those loads that impose two greatest stresses.

* * * * *